July 23, 1935.  G. A. JULIUS ET AL  2,008,790
GRAND TOTAL TRANSMISSION MECHANISM FOR TOTALIZATORS
Filed Aug. 3, 1932  6 Sheets-Sheet 1

July 23, 1935.  G. A. JULIUS ET AL  2,008,790
GRAND TOTAL TRANSMISSION MECHANISM FOR TOTALIZATORS
Filed Aug. 3, 1932   6 Sheets-Sheet 4

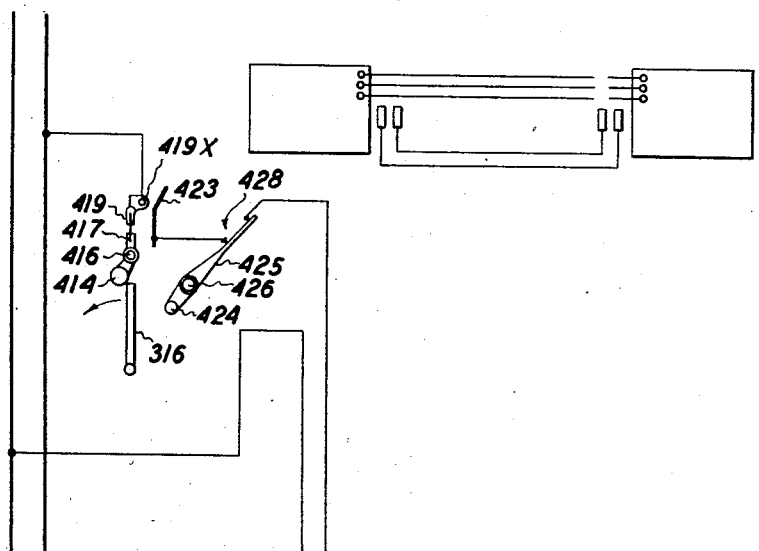
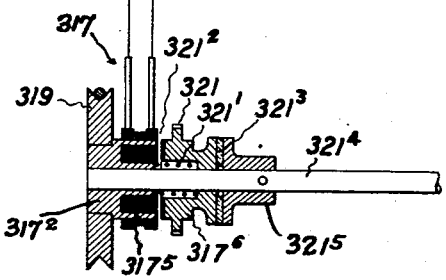
FIG. 10

Patented July 23, 1935

2,008,790

UNITED STATES PATENT OFFICE 2,008,790

GRAND TOTAL TRANSMISSION MECHANISM FOR TOTALIZATOR

George Alfred Julius and Awdry Francis Julius, Sydney, New South Wales, Australia Application August 3, 1932, Serial No. 627,371 In Australia August 19, 1931

1 Claim. (Cl. 235—92)

This invention relates to one unit of a totalizator assembly which is built up on an inter-connected individual unit system. In such an assembly the first unit is a group of ticket issuing machines of which any number required to cope with the business in prospect is provided. These ticket issuing machines individually transmit their registrations of tickets for each horse to an escapement in the second unit. This second unit is a group of integrating mechanisms. One of these integrators sums up the grand total of all the registrations on the ticket machines, and the other integrators in the group respectively sum up the individual horse totals. Such an integrating mechanism is the subject of our co-pending United States application Serial No. 627,369 filed August 3, 1932.

The third unit is a gear box which is connected up to the grand total integrator abovementioned. In this gear box certain deductions are made from the grand total, and the remaining total is proportioned according to the required divident system on which the betting is being conducted. This unit is the subject of the present application. The summation of the movements in the gear box is applied to a grand total indicator and also to the shaft of a master self-synchronizing motor. This motor is wired in series with a plurality of distant self-synchronizing motors, each of which respectively operates a distant grand total indicator.

The fourth unit is a group of ratio or odds computing and indicating devices in which the ratio of the adjusted grand total in relation to the respective horse totals is transformed into a mechanical movement and displayed as "odds". Each computer is connected up to one of the horse total integrators abovementioned, and all of them are connected up to the grand total gear box abovementioned. This unit is the subject of our co-pending United States applications Serial Nos. 540,734 filed May 28, 1931 and 627,370 filed August 3, 1932.

The fifth unit of the series comprises a control station from which a plurality of distant indicators is operated. This unit is the subject of our co-pending United States application Serial No. 627,371 filed August 3, 1932.

The present invention relates to the third unit in such an assembly, that is to say, to the gear box to which the summation of all the ticket registrations are transmitted from the grand total integrator and in which percentages are deducted, and the adjusted total proportioned according to the required dividend system, the result being then transmitted to the grand total shaft of the ratio computers as will be hereinafter described.

In the accompanying drawings:—

Fig. 3 is a section on the plane 3—3, Fig. 1;

Fig. 4 is a fragmentary elevational view explanatory of an automatic switch shown at the left upper part of Fig. 1;

Fig. 5 is a detail of the mechanism for resetting the grand total indicators at zero;

Fig. 10 is a diagram illustrating the electrical connection between the automatic switch and the electromagnetic clutch shown in Fig. 1.

Figure 8:
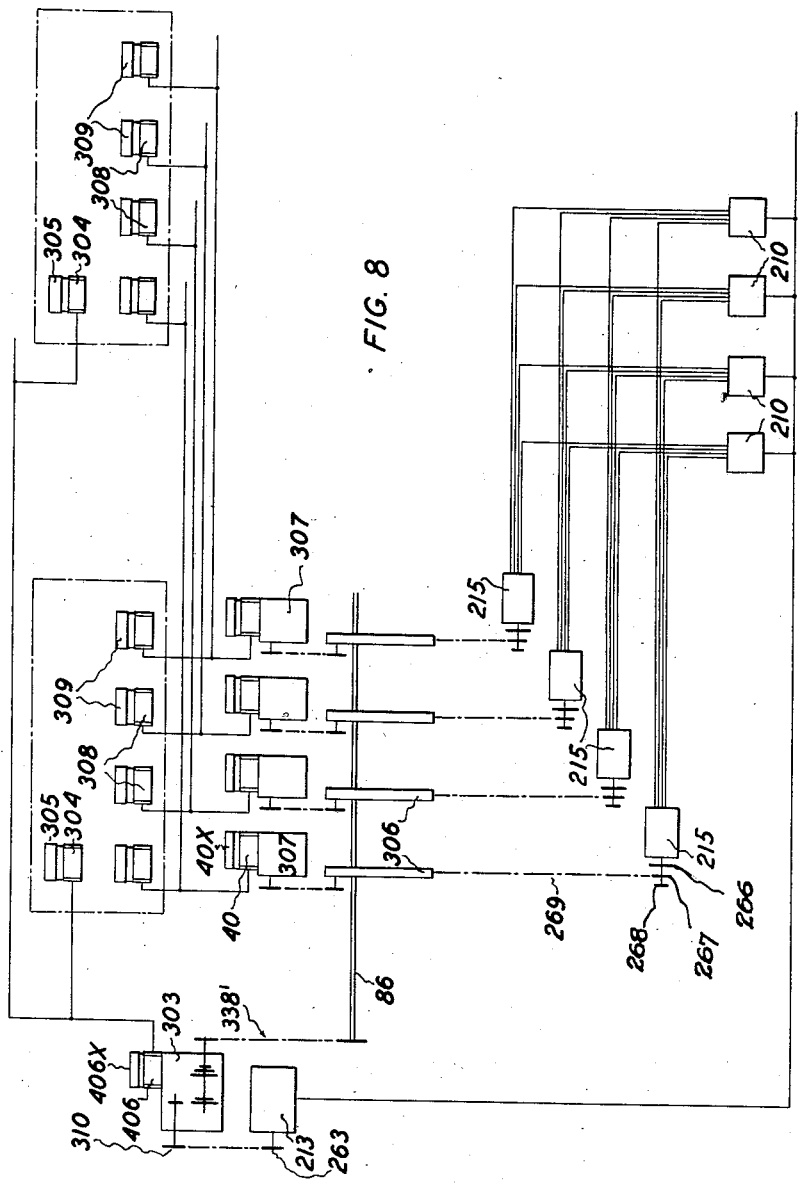
Fig. 8 is a diagram illustrating an installation of which the gear box forms one unit.

In Fig. 8 the ticket issuing machines are indicated at 210 and the horse total integrators at 215. 213 is the grand total integrator, and 303 the grand total gear box which controls the grand total indicator 406× and self-synchronizing motor 406. 304 are the distant self-synchronizing motors and 305 the distant indicators electrically connected with the grand total gear box. 306 are the computers from each of which movement corresponding to the required ratio is transmitted to a relay gear 307 including a master self-synchronizing motor 40 and odds indicator 40× in a main control station from which distant self-synchronizing motors 308 and indicators 309 are operated in synchronism.

The summation of the registrations received from the grand total integrating mechanism 213 which precedes this unit as above described, is applied by chain drive from a sprocket 268 (Fig. 8) to a sprocket 310. The sprocket 310 is fixed to the sun wheel 311 of an epicyclic box 298, and the planet assembly 312 of this box is fixed on a shaft on which the sprocket 310 and the two sun wheels 311 and 313 are loosely mounted for rotation. The back sun wheel 313 has fixed to it a spur wheel 314 which meshes with a pinion 315 on a shaft 353. A tappet arm 316 which coacts with a switch shown in Fig. 4 is carried on the planet assembly 312. When movement is transmitted to the sprocket 310 by the chain drive in correspondence with the movement of the grand total integrator 213, a circuit is closed through this switch and through a magnetic clutch 317 which is thereby energized, as will be described later.

Primary drive is applied by a belt 318 running over a pulley 319. This belt runs continuously, driving the primary member of the electromagnetic clutch 317, and when this clutch is energized drive is transmitted from the pulley 319 via the clutch 317 through a pinion 321 and gear wheel 320 to a shaft 322, and through this shaft rotation is transmitted through a gear wheel 323 (Fig. 9) to a spur wheel 324 (Fig. 3), to the side of which two spur wheels 325—326 of differential diameter are fixed, then to a worm shaft 327 through a clutch 328. The worm 331 on the worm shaft 327 meshes with the worm wheel 332 on the cross shaft 333; this shaft 333 carries a bevel wheel 334 which meshes with two opposed bevel wheels 335 and 336.

The wheel 336 is pinned to a shaft 337 to which is also fixed a sprocket wheel 339. The wheel 335 runs loosely on the shaft 337 and it carries on its outer side a sprocket wheel 338. The sprocket wheels 338 and 339 turn in opposite directions and one or other of them is connected by a sprocket chain 338' to the grand total drive shaft 86 in the ratio computing mechanism 306 previously referred to. These two wheels 338 and 339 are provided in the gear box to facilitate erection of the totalizator assembly in different locations, and the chain 338' can be driven either left hand or right hand as required, by meshing it with the appropriate wheel 338 or 339. When required two groups of computers are used and in that case one group is geared up to the sprocket 338 and the other to the sprocket 339.

Figure 1:
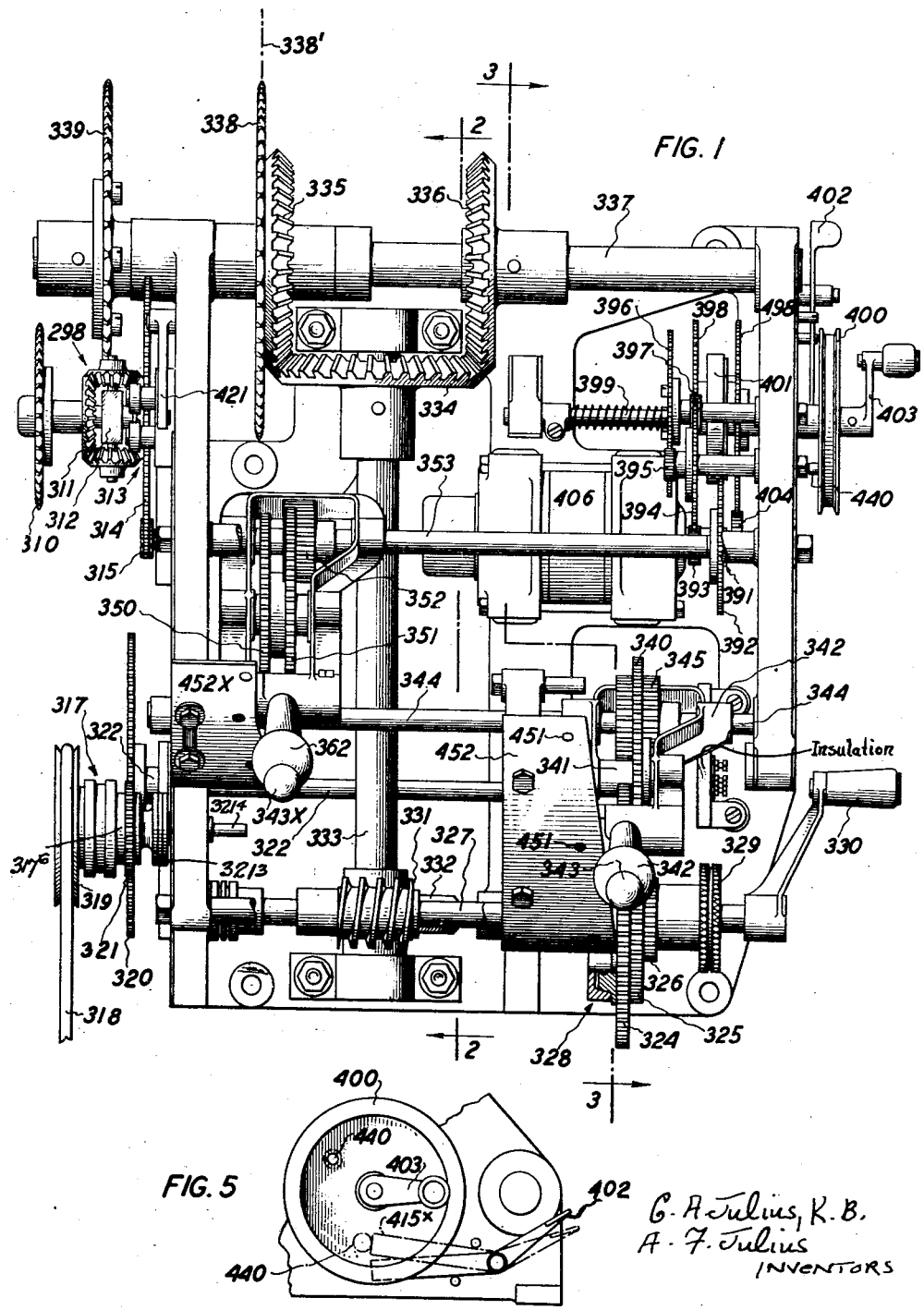
Fig. 1 is a plan view of the gear box which is the subject of the present invention.
Figure 9:
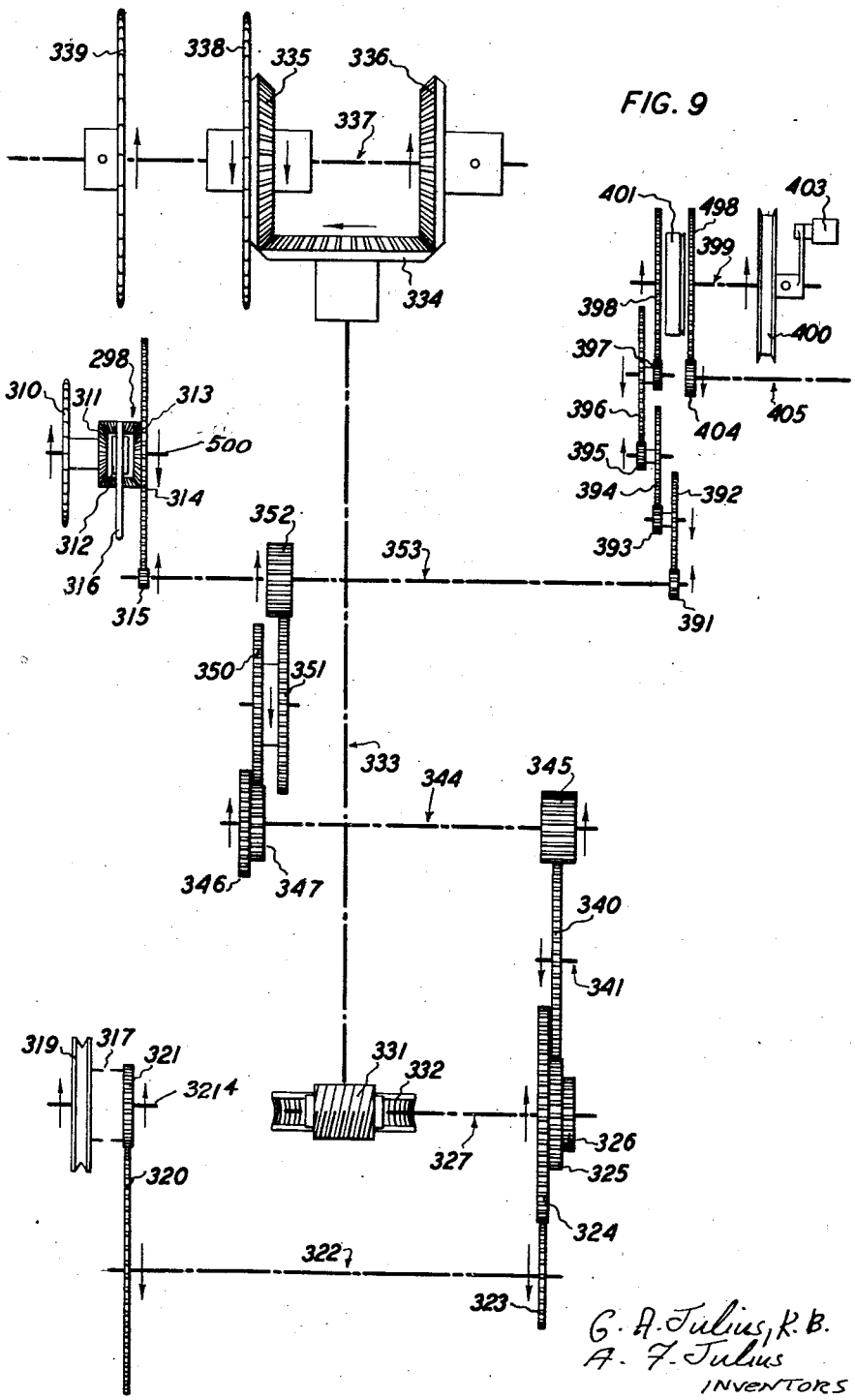
Fig. 9 is a diagram explanatory of the gear box transmission system.

In the integrating mechanism above referred to provision is made for altering the transmission gearing which connects the horse total integrators 215 to the computers 306, so that the transmission can be geared up or geared down according to the anticipated volume of business to be passed through the machine for any one session. For this purpose, in each horse total integrator 215 a chain belt 269 is engageable with one or other of three sprockets 266—267—268 which are of differential diameter, and this belt actuates the horse total element in the computer 306. When such a change is made in the horse total integrator gearing, a corresponding change must be made in the transmission which connects the grand total mechanism 303 with the computers 306, and this change is effected by a capacity change gear arrangement 324—325—326 in the grand total gear box as shown in Figs. 1, 3 and 9.

Figure 2:
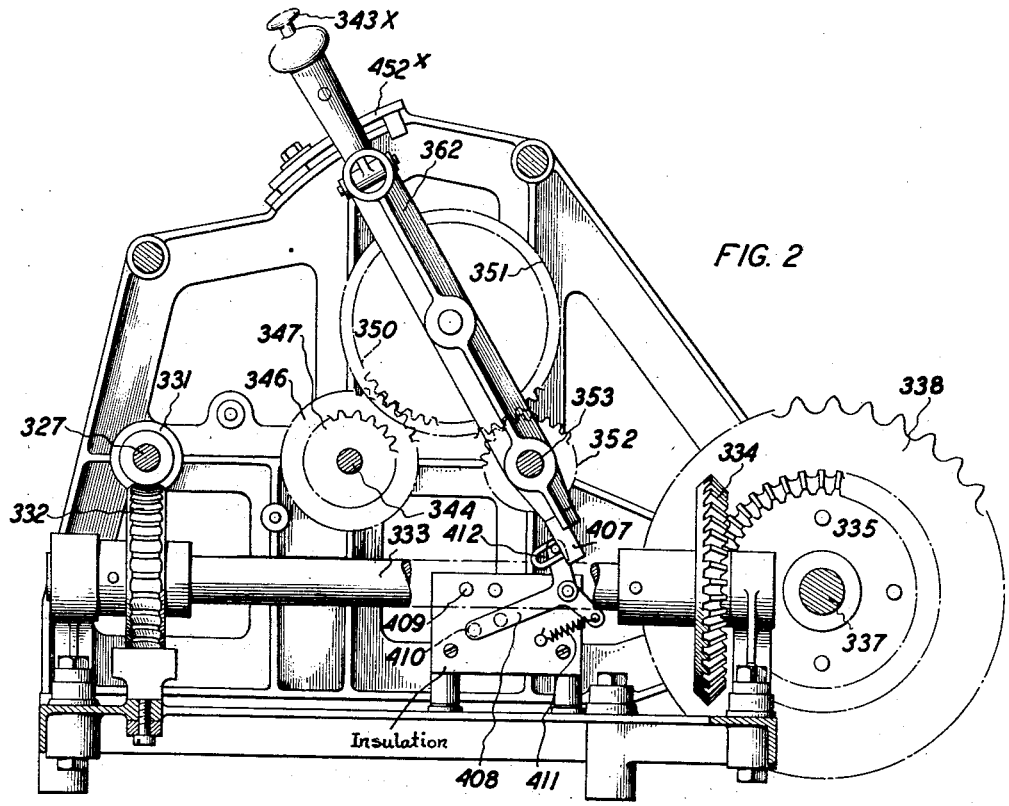
Fig. 2 is a section on the plane 2—2, Fig. 1.
Figure 7:
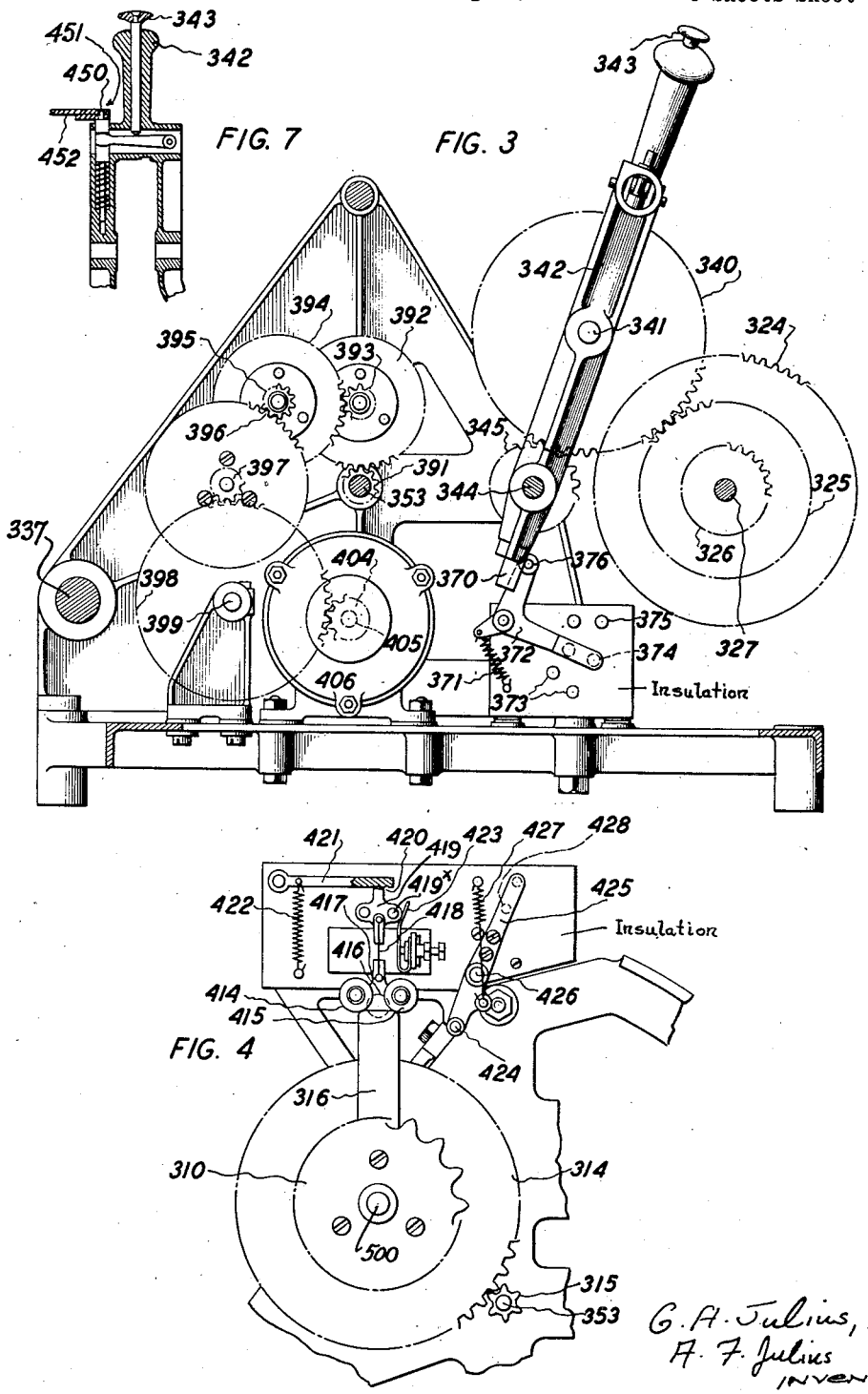
Fig. 7 is a detail of a latch lock.

The spindle 341 of a change gear wheel 340 is carried in a change gear lever 342 which is slidable along its fulcrum centre 344 to bring the wheel 340 into mesh with one or other of the wheels 324—325—326. The wheels 324—325—326 have the same ratio as the corresponding chain wheels 266, 267 and 268 in the horse total integrators 215 above mentioned. The lever 342 is fitted with a latch arrangement, shown in Fig. 7, to hold it in the required one of three set positions. The latch 450 is engageable in one or other of the holes 451 in a sector plate 452, and it is releasable by a push button 343. Motion is transmitted from the wheel 324, 325 or 326 with which the change gear wheel 340 meshes, to a sprocket 345 which is keyed on a spindle 344. This spindle has fixed on it two pinions 346—347 (Figs. 2 and 9). With these pinions there meshes a spur wheel 350, and this spur wheel 350 is fixed to another spur wheel 351 which in turn gears with a long pinion 352. The pinion 352 is keyed on a spindle 353 on which a pinion 315 is also keyed. The pinion 315 meshes with the pinion 314 which is fixed to the sun wheel 313 of the epicyclic box 298.

The spindle of the selector gear 350—351 is carried in a change gear lever 362 which is slidable on the shaft 353 and is movable angularly about that shaft to enable the wheel 350 to be meshed with the pinion 346 or with the pinion 347 as required. This lever 362 is also provided with a latching arrangement 343× and 452× similar to the latching arrangement provided for the lever 342. The differential pinions 346—347 are provided to alter the ratios according to the dividend system which is to be operated, as for instance a place payment on the basis of dividend for two placed horses or dividend for three placed horses, or dividend for the winner only, or any other system which may be required, the diameter of the pinions 346—347 being appropriately proportioned. The ratio between the spur wheels 350 and 351 corresponds with the percentage deduction to be made from the grand total to cover taxes, commission, and other items which are excluded from the moneys available for distribution as dividend to winning investors.

Figure 6:
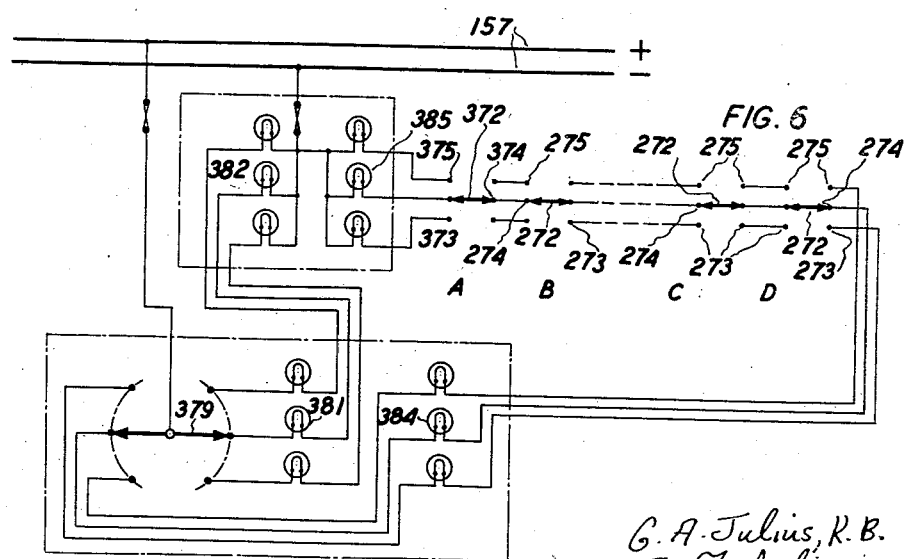
Fig. 6 is a wiring diagram explanatory of the control system by which a manager directs the setting of the gear box controls and assures himself and assures the operators that the connections are all completed in proper sequence.

The alteration in the angular position of the change gear lever 342 which is necessary to effect alteration of the angular position of the change wheel 340, results in operation of a switch arm 372 which moves over three sets 373, 374, 375 of pair contacts. These contacts are respectively connected to three separate signalling circuits. An offset pin 376 on the switch arm 372 is held in contact with the tail 370 of the lever 342 by a spring 371. If the position of the gear lever 342 is changed, the circuit is also automatically changed, but the new circuit is not established until the necessary corresponding changes have been made in all the horse total integrators 215 in the system. This is illustrated in Fig. 6, in which the contacts of the grand total gear box are indicated at A and the contacts of three horse total integrators at B, C, and D. At A, the switch 372 is shown closing the contacts 374. This is the position of the switch shown in Fig. 3. In the horse total units B, C, and D, the corresponding switch arms are marked 272 and the corresponding contacts are marked 273, 274 and 275 respectively.

379 represents a switch in the manager's room for connecting up any one of the three circuits to indicate to an operator the adjustment which is required to be made in the gearing to set up the apparatus for any certain capacity. When, for instance, the switch 379 is set on the middle circuit, as seen in the figure, an indicator lamp 381 associated with the switch 379 and an indicator lamp 382 in the operator's room light up. This signal indicates to the operator that the circuit 374 is required to be operated. The operator thereupon moves the gear lever 342 to bring the change wheel 340 into mesh with the wheel 325. The switch 372 is thus moved over to close the contacts 374, but the circuit is not completed until a corresponding gear change has been made at 272—274 in every horse total integrator in the installation. When the circuit is completed, the check lamps 384 and 385 in the manager's room and in the operator's room respectively light up. The lighting of these lamps indicates to the manager and to the operator that the correct change of gear has been made throughout the installation.

The drive transmitted through the change gear 350—351 is taken from the pinion 352 onto the shaft 353. On this shaft 353 there is fixed a pinion 391 which meshes with a spur wheel 392. From the wheel 392 the drive is taken through a reduction train 393, 394, 395, 396, 397 and 398 onto a shaft 399. A pulley 400 is connected to the shaft 399 through a friction clutch 401 and from this pulley, movement is transmitted to the grand total indicator 406× which is preferably of the barometer or sliding tape type described in our pending application No. 540,734 filed May 28, 1931. To reset the indicator 406× at zero before the commencement of a race, a release lever 402 is depressed to the dotted line position shown in Fig. 5, and a hand crank 403 which is fixed to the shaft 399 is turned in anti-clockwise direction until a stop 440 on the side of the pulley 400 contacts with the heel 415× of the lever 402. This movement brings the indicator 406× to the zero position. During this reversing movement, the clutch 401 slips. The wheel 498 at the end of the reduction gear train meshes with a pinion 404 on the shaft 405 of a self-synchronizing motor 406. The resultant movements of the shaft 353 are applied through the gear train 391—398, 498 and 404 to advance the armature of the motor 406 step-by-step as the betting registrations mount up, and this motor controls the movements of any required number of similar self-synchronizing motors circuited with it, through which other grand total indicators at distant positions are operated, as indicated in Fig. 8.

The change gear lever 362 carries the double spur wheel 350—351 of which the member 350 meshes with the pinion 346 or 347, the pinion 351 meshing with the pinion 352 as already described. The tail piece 407 of this lever operates a switch arm 408. This switch arm 408 moves over two sets of pair contacts 409—410, and is normally held in contact with the tail piece 407 by a spring 411. Lost motion is provided by a pin and slot arrangement 412. The movement of the lever 362 in effecting a gear change, operates to throw the switch arm 408 so as to close it on the appropriate pair of contacts 409—410 and thus complete a signal circuit somewhat similar to that which is shown diagrammatically in Fig. 6. Check lamps are contained in these circuits as in the Fig. 6 circuits, in order to give assurance to manager and operator that the gear lever 362 is set at the required position.

The tappet arm 316 which is fixed to the planet assembly 312 coacts with two tappet rollers 414 and 415 (Fig. 4) carried on the arms of a rocker 417 which works on a pivotal centre 416. It is fixed to the planet assembly 312 of the epicyclic box 298, and when any movement is transmitted from the grand total integrator 213 to the epicyclic box 298 through the sprocket 310, the arm 316 which is carried on the rotor 312 is tilted. The stem portion of the rocker 417 has a flat spring blade 418 fitted in it and this spring blade carries a latch piece 419, the top end of which is fitted with a ball latch which is engageable with either of two notches 420 in a latch lever 421, which is normally held down by a spring 422. The latch lever 421 resists movement of the piece 419 to a limited extent, but when the piece 419 is more or less fully thrown by the lateral movement of the arm 316 tilting the piece 417, the latch ball jumps out of the inner notch 420 into the outer notch and completes a circuit through a projecting pin 419× and spring terminal 423. When this circuit is thus closed, the clutch 317 in the main drive is energized and movement is transmitted through the clutch 317 and through the shafts 322—327—333 and 337 to a sprocket wheel 338 which is connected by a sprocket chain 338′ to the grand total shaft 86 in the ratio computer mechanism 306 shown in Fig. 8. Drive from the pulley 319 is also transmitted through the shafts 322—327—344 and 353 to the gearing 391—404 (shown in Fig. 9) which controls the grand total indicator mechanism 406—406× (Fig. 8). The movement of all of these shafts is controlled by the epicyclic box 298 which is mounted on a countershaft 500 and is itself checked and controlled by electro-mechanical escapements in the grand total integrator 213 (Fig. 8) through the sprocket 310. This clutch drive at the same time applies reversing movement to the gear wheel 314 through the pinion 315 and as long as the rate of transmission through the sprocket wheel 310 and sun wheel 311 is approximately equal to the rate of transmission through the reversing wheel 314 and sun wheel 313, the rotor 312 and the tappet arm 316 remain almost stationary in their tilted position, and the clutch circuit remains closed. When the transmission through the sprocket 310 and sun wheel 311 ceases, the clutch 317 continues to drive the gear wheel 314 and sun wheel 313 reversely and as the sun wheel 311 is then stationary the planet assembly brings the tappet arm back to the position shown in Fig. 4, thus opening the switch contact at 419×—423 and de-energizing the electro-magnetic clutch 317 as shown in Fig. 10. While the clutch 317 remains de-energized the gears 315 and 314 are checked against rotation by the intermediate gearing. If any movement is transmitted to the sprocket 310 from the grand total integrator 213 while the gears 315—314 are thus held stationary, the planet assembly 212 commences to rotate thus tilting the tappet arm 316 and the rocker 417 and closing the clutch circuit at 419×—423 as previously described.

If in the operation of the apparatus, the rate at which registrations come through from the grand total integrator 213 is faster than the rate at which the continuous drive from the pullley 319 operates the reversing gear pinion 315, the arm 316 will continue to travel around until it strikes the tappet 424 on the back end of a circuit release lever 425; this lever is fulcrumed at 426 and is held normally in one or other position by a spring 427. When it is knocked over by the over-run movement of the arm 316, it opens a circuit at the contacts 428 and thus opens the main operating circuit and brings the installation to rest. When the cause of the interruption has been ascertained and the fault corrected the lever 425 is manually returned to the position shown in Fig. 4.

The operating circuit is shown in Fig. 10 in which also the electromagnetic clutch 317 is illustrated. When the arm 316 tilts the rocker 417 on its pivot 416, the contacts 419× and 423 are closed and the clutch solenoid 317⁵ is energized. The driving member 317² of the clutch is fixed to the drive pulley 319 and is rotatable on a fixed spindle 321⁴ which is mounted in a fixed bearing 321⁵. The driven member 317⁶ of the clutch is slidable and rotatable on the shaft 321⁴ and it carries the pinion 321. When the solenoid 317⁵ is energized the driven element 317⁶ is moved along the shaft 321⁴ against the action of the helical spring 321¹, into engagement with the face 321² of the driving member 317². Drive is then transmitted from the pulley 319 through the clutch 317 to the transmission gearing as before described. When the clutch circuit is broken at 419—423 or at 423—425, the clutch 317 becomes deenergized and the clutch member 317⁶ is forced by the spring 321¹ out of engagement with the driving member 317² and into engagement with the face 321³ of the fixed member 321⁵. This face is covered with frictional material which acts as a brake on the rotation of the pinion 321.

When the nut 329 (Fig. 1) is eased back, the shaft 327 is declutched from the triple gears 324—325—326. While the gears 324—325—326 are thus disengaged the shaft 327 and the gearing 331—332—334—334—336 can be reversely driven by means of the hand crank 330 to reset the grand total gearing in the computer mechanism 306.

What we claim as our invention and desire to secure by Letters Patent is:—

A totalizator relay gear box comprising in combination a constantly driven member, a primary shaft, means including an electromagnetic clutch for coupling said shaft to said member, a take-off shaft, a gear train between said primary shaft and said take-off shaft, a plurality of change gear wheels in said train for varying the rate of transmission to said take-off shaft, a countershaft, an epicyclic gear mechanism the rotor of which is fixed to said countershaft, a sprocket wheel fixed to one sun wheel and a gear wheel fixed to the other sun wheel of said epicyclic mechanism, said sprocket wheel adapted for transmitting movement to said epicyclic mechanism in correspondence with the movement of a grand total integrator, a gear train between the primary shaft and said gear wheel for permissively controlling said first mentioned gear train, a grand total indicator drive member, a gear train connecting said indicator drive member with said gear wheel, an energizing circuit through the electromagnetic clutch, a tappet arm fixed to the rotor of said epicyclic mechanism, and a pivoted contact member coacting with said arm to automatically close said circuit when movement is transmitted to said epicyclic mechanism through said sprocket and to automatically open said circuit when said movement ceases.

GEORGE ALFRED JULIUS.
AWDRY FRANCIS JULIUS.